UNITED STATES PATENT OFFICE.

CYRUS S. GRIFFITH, OF MURPHYSBOROUGH, ILLINOIS.

HOG-CHOLERA REMEDY.

SPECIFICATION forming part of Letters Patent No. 347,483, dated August 17, 1886.

Application filed May 28, 1886. Serial No. 203,542. (No specimens.)

*To all whom it may concern:*

Be it known that I, CYRUS S. GRIFFITH, a citizen of the United States, residing at Murphysborough, in the county of Jackson and State of Illinois, have invented a new and useful composition of matter to be used for the treatment and prevention of cholera in hogs and other domestic animals, of which the following is a specification.

My composition consists of the following ingredients, combined in the proportions stated, viz: Eight (8) ounces red Dutch madder, seven and one-half (7½) ounces Epsom salts, one-half (½) ounce pulverized asafetida, and one (1) dram lamp-black. These ingredients are to be thoroughly mixed.

In using the above composition it should be administered in the following manner: By mixing the same with swill, milk, or dry bran, giving to each grown animal one tablespoonful three times per day. Smaller animals in proportion.

By the use of the above-named composition what is known as "hog cholera" and kindred diseases of swine and other domestic animals are rapidly eradicated.

I am aware that other compositions have been used for the purpose above, but I am not aware that all the ingredients in my composition, or in the proportion stated, have been used together, or that any patent has been applied for or granted for a preparation of this composition.

What I claim, and desire to secure by Letters Patent of the United States, is—

The herein-described composition of matter to be used for treating and preventing cholera and kindred diseases in swine or hogs and other domestic animals, consisting of red Dutch madder, Epsom salts, asafetida, and lamp-black, in the proportions specified.

CYRUS S. GRIFFITH.

Witnesses:
E. B. HAMILTON,
E. F. O'HAVER.